March 11, 1930. W. F. GROENE 1,750,589
AUTOMATIC LATHE CONTROL
Filed Nov. 30, 1927 7 Sheets-Sheet 1
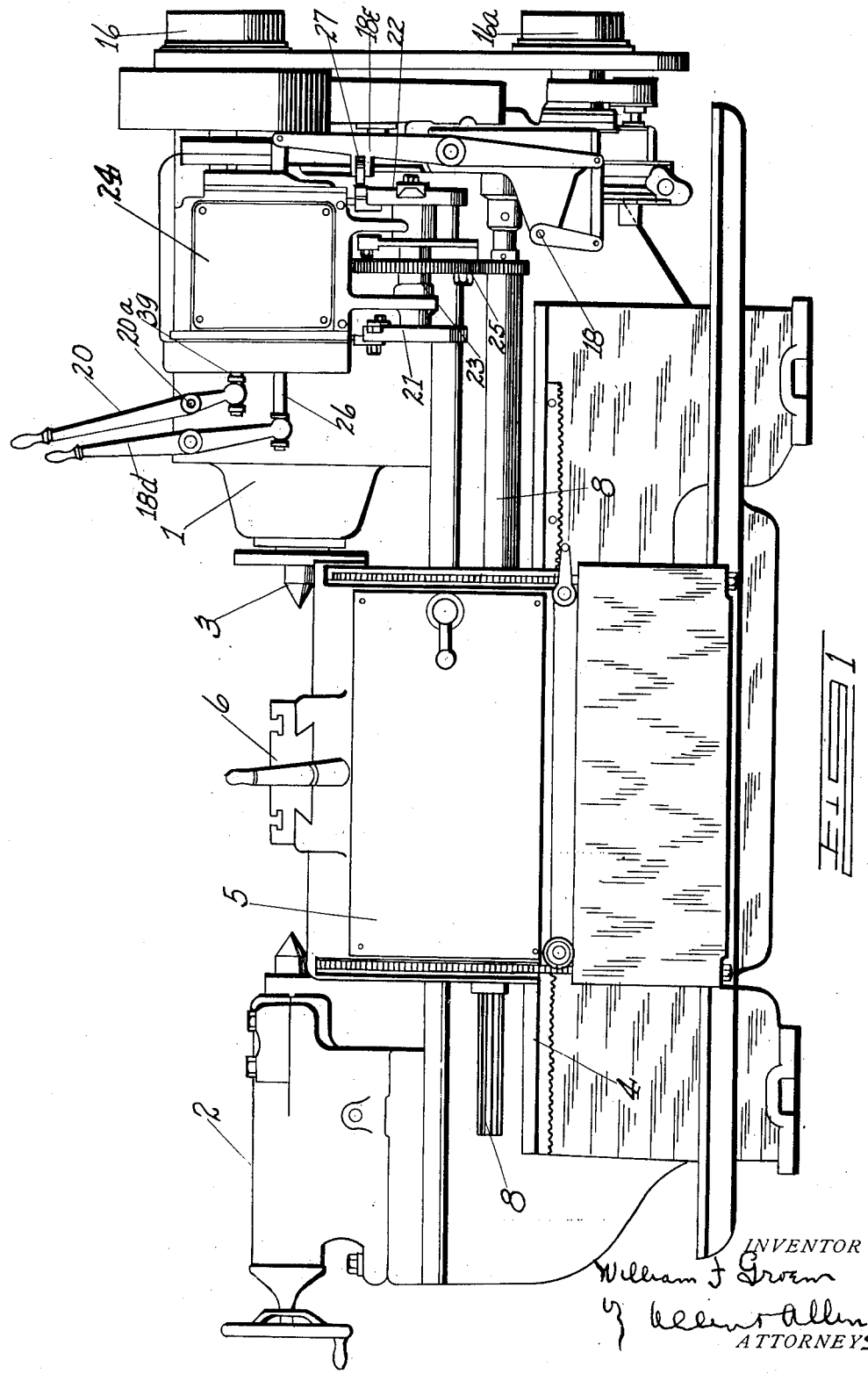
INVENTOR
William F. Groene
by Allen & Allen
ATTORNEYS

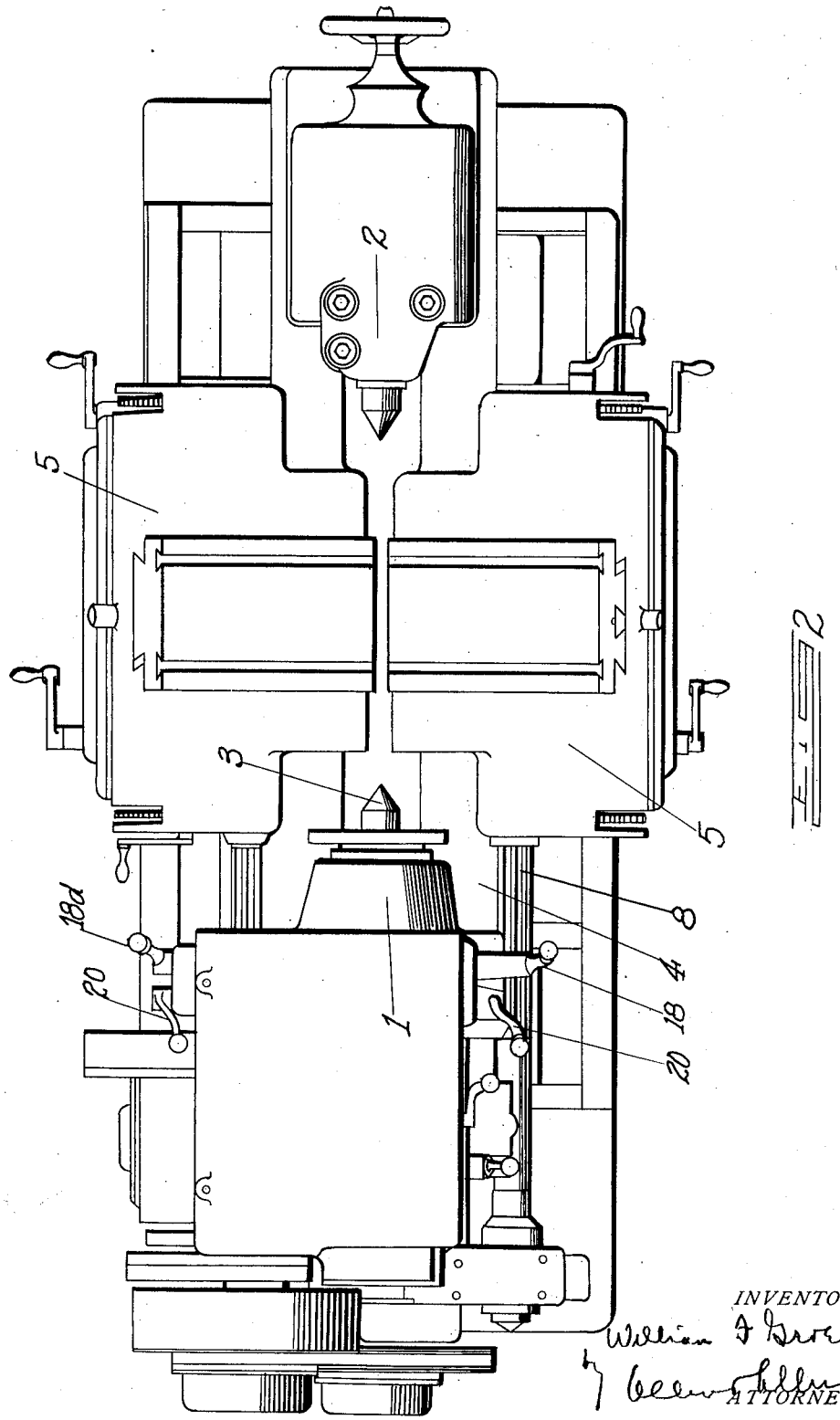

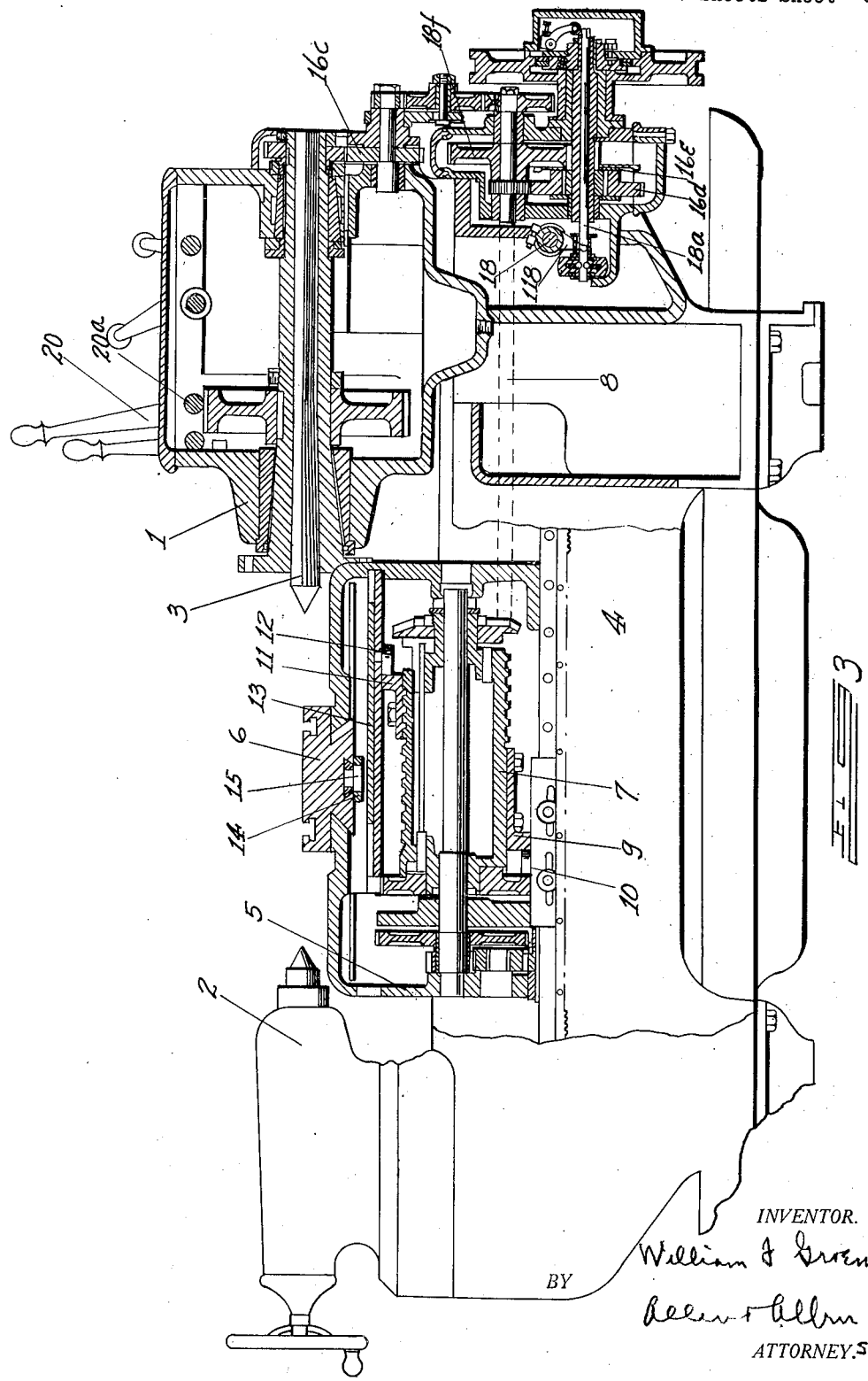

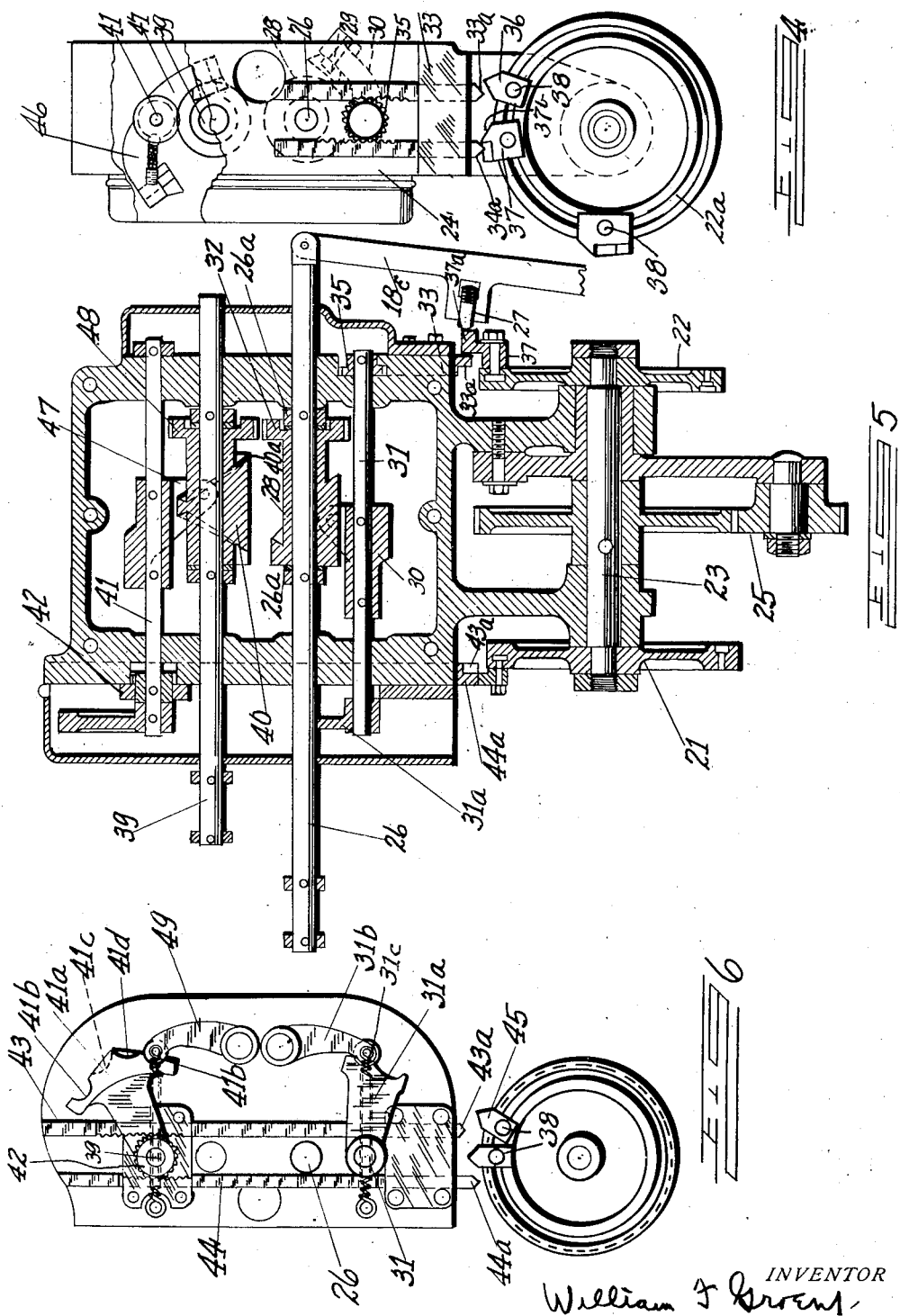

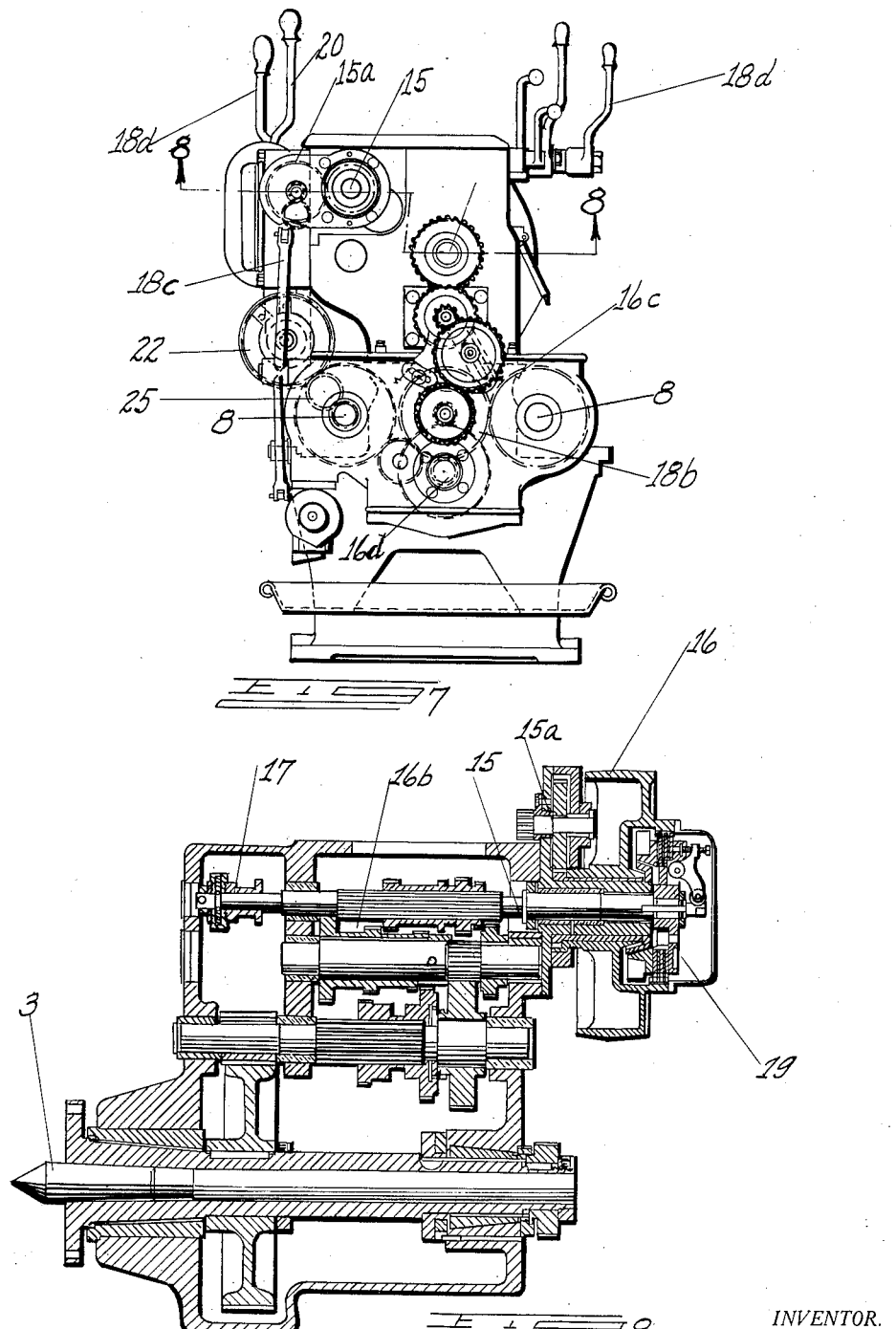

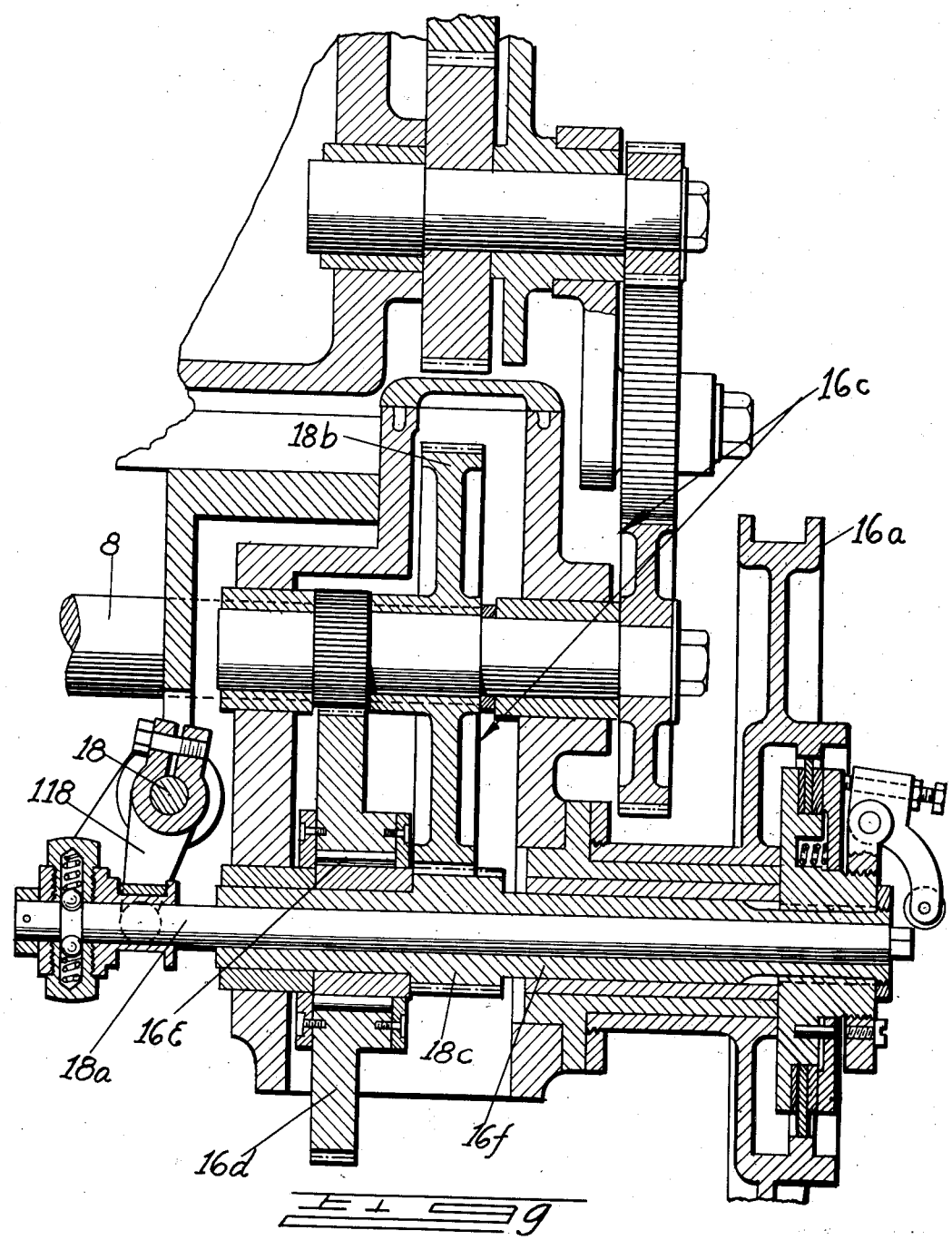

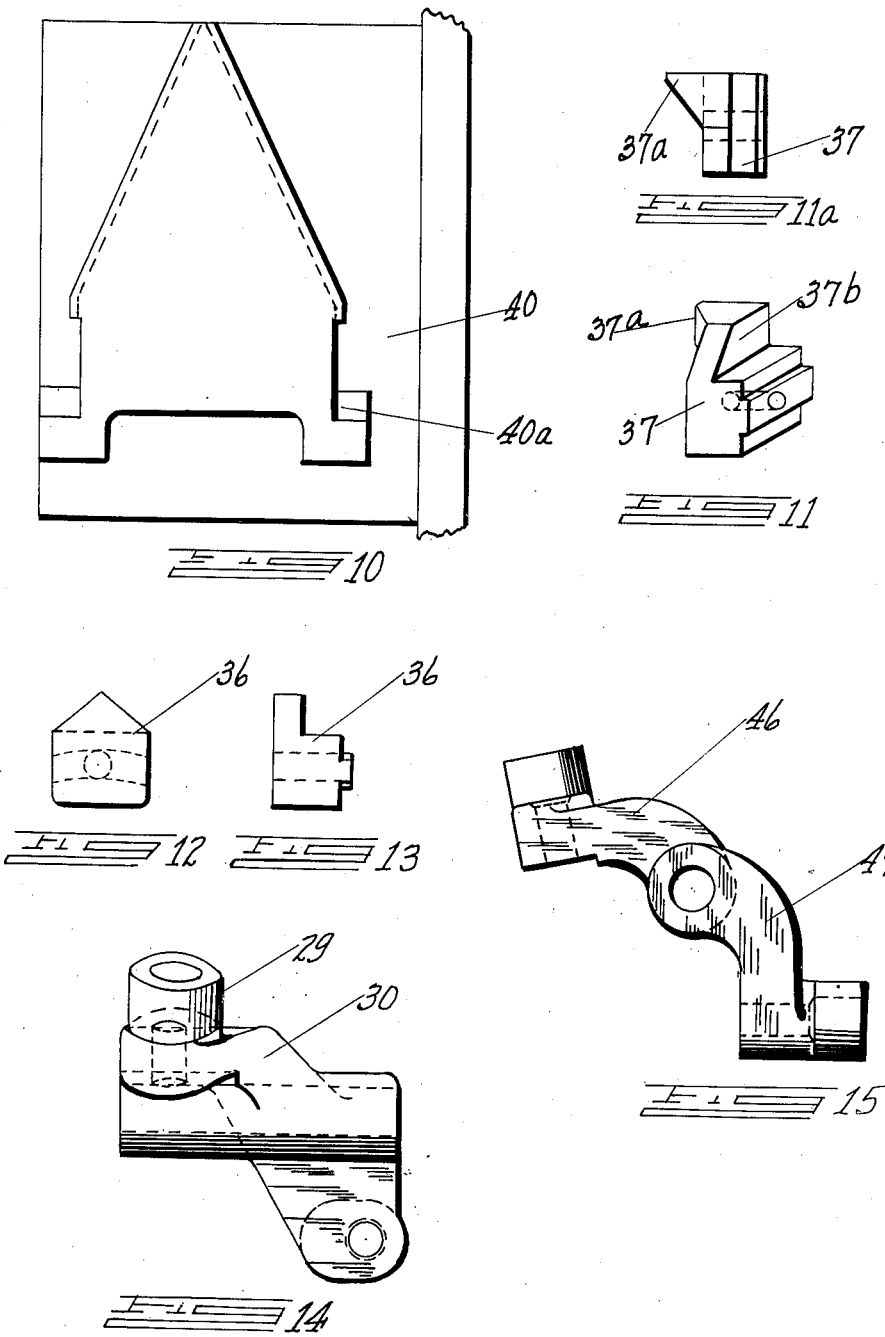

Patented Mar. 11, 1930

1,750,589

UNITED STATES PATENT OFFICE

WILLIAM F. GROENE, OF CINCINNATI, OHIO, ASSIGNOR TO THE R. R. LE BLOND MACHINE TOOL COMPANY, OF CINCINNATI, OHIO, A CORPORATION OF DELAWARE

AUTOMATIC LATHE CONTROL

Application filed November 30, 1927. Serial No. 236,831.

My invention relates to control devices for automatic lathes in which the operator prearranges a certain schedule or cycle of operations, and then merely pulls a lever which will start the mechanism into operation, and cause it to run its full cycle and then to come to a stop, ready for the insertion of another piece of work, and a repetition of the same cycle.

In the automatic lathe, it is desirable to feed the tools up to the work rapidly, then cause them to move at cutting speed for a predetermined length of time, and then to return rapidly to the starting position where they and the whole machine come to a stop.
The spindle of the lathe must start and stop also, as a part of the cycle because the work is placed into the machine into operative relation to the spindle, and removed therefrom at the end of the cycle of operations.

The particular type of machine which I have illustrated without great particularity of detail, to which the control structure is applied, is intended as illustrative of an automatic lathe feed, which is representative of the general type of movements which are to be controlled. There are many other forms of automatic lathes to which my novel control is applicable, and the one I have illustrated happens to be one which I have invented, as set forth and described in an application for Letters Patent in the United States, filed August 12, 1926, Ser. No. 128,818.

The object of my invention is to provide a simple structure which is positive in its operation, and fulfills the requirements for a fully adjustable, and a fool-proof device to accomplish my stated object.

I accomplish my invention by that certain construction and arrangement of parts of which an illustrated embodiment will be hereinafter more specifically pointed out, and the novelty of which invention, as illustrated by said embodiment, will be set forth in the appended claims.
In the drawings:—

Figure 1 is a side elevation of an automatic lathe.

Figure 2 is a top plan view thereof.

Figure 3 is a longitudinal section thereof.

Figure 4 is a side elevation of the control box.

Figure 5 is a central vertical section taken on Figure 4.

Figure 6 is a side elevation of the parts shown in Figure 4 taken from the other side of the device.

Figure 7 is an end elevation of the head of the machine, showing the drive.

Figure 8 is a horizontal section taken from beneath the spindle of the parts shown in Figure 7.

Figure 9 is an enlarged section of the portions of the drive shown in Figure 3, including the overrunning gear work drive.

Figure 10 is a development of the cam in the control box which operates the work and spindle clutch.

Figure 11 is a perspective of one of the dogs on the cam wheel which operates directly against the rapid traverse levers.

Figure 11ª is a plan view of said dog.

Figure 12 is a side elevation of the other form of dog used on the cam wheels.

Figure 13 is a side elevation thereof.

Figure 14 is a detail of the lower shifter arm.

Figure 15 is a detail of the upper shifter arm.

Referring first to the general aspects of the machine to which my novel device is attached, there is the head stock 1 and the tail stock 2. The spindle 3 as indicated is driven rotatively during the operation of the machine, to revolve the work. The machine is shown as being alike in operation on both sides, so as to permit of the full range of cutting operations at both sides of the work. The bed 4 of the lathe supports the carriages 5, 5, and the cross feed blocks 6, 6 slide in the carriages. The operation of the carriages and cross feed blocks for lengthwise and crosswise feeds in the illustrated machine is accomplished by drums 7, which are driven by splined shafts 8. The drums have cylindrical cams, as at 9, secured thereto, which engage rollers 10 secured in adjusted position along the bed. The drums being supported by and movable with the carriages thus force the carriages in a path along the bed, and back again, with the full rotation of the drums. The cams 11 on the drums engage the rollers 12 held on slides 13 in the carriages. These slides have lugs 14 thereon which engage rollers 15 on the cross feed blocks, and thus feed the blocks in and out as determined by the several elements noted. There may be a pair of cams on the drum for each movement, one for movement through one-half of the cycle and one through the other.

The operation of the machine is controlled from the main feed box or gear box located at the head stock end of the machine. The power input is to the pulley 16 on a shaft 15 which is connected by gearing and a clutch 19 operated at 17 to the spindle 3. A belt connects the pulley 16 with the rapid traverse pulley 16ª.

While the gearing is not completely shown, it will be understood that the change gear structure is at 16ᵇ, which is connected by a series of gears indicated generally at 16ᶜ, with the large gear 16ᵈ. The gear 16ᵈ is connected to the rapid traverse shaft structure by a roller ratchet, as indicated at 16ᵉ, same being mounted on the rapid traverse shaft 16ᶠ. The clutch lever shaft 18 has an arm 118 which moves the rod 18ª which controls the clutch for the pulley 16ª of the rapid traverse, and the drive to the feed shafts is from a gear 18ᶜ cut on the rapid traverse shaft, to the large gear 18ᵇ, which drives the shafts 8 (one on each side of the machine).

When the work feed is in operation and the rapid traverse shaft is coupled with the rapid traverse pulley, the roller ratchet gear structure will permit the gear 16ᵈ to continue to rotate slowly, while the feed shafts 8 are driven rapidly by the rapid traverse shaft. The hand levers 18ᵈ are used to operate the rapid traverse manually, same being connected up as will be described.

The clutch for the spindle and work drives is operated by a lever 20 on the shaft 20ª which extends across the machine, said shaft having an arm (not shown) which engages the operating collar 17 (Fig. 8) of the work drive clutch. The gearing for driving the control box is not actuated by the work drive or the rapid traverse drive, but is operated from the gearing shown generally at 15ª which is driven directly by the pulley 16, so that the control box cams are continuously actuated for the purposes to be described.

The object of the mechanism which makes up the invention which I wish to cover by this application consists essentially of an automatic device for acting upon the rapid traverse and work drive clutches, to shift them in a prearranged relation. The particular form of drive and the mechanism actuated thereby is not of essential importance, except, of course, the direction of movement of the parts.

Located on a suitable common shaft 23 beneath the control box are a pair of cam wheels or timing wheels 21 and 22, and just above these wheels is the control box or shifter box 24, in which the shifter mechanism is mounted.

The shaft 23 is driven from the adjacent feed shaft 8 by means of gearing indicated at 25. This is an advantage because the shifter devices are shifted at rapid intervals during rapid traverse, and at longer intervals during work drive, and the shafts 8 are those whose speed of revolution determines whether rapid or slow movement is being imparted to the carriages and tool slides.

The cam drums make a single revolution during the complete cycle of the machine, and the feed shafts may or may not revolve in unison with the drums. In the illustrated structure it will be assumed that the feed shafts 8 and the drums revolve in unison.

The duty of the control mechanism, in the structure which has been described for illustration, is to bring about an automatic operation of the work and traverse clutches, so that the operator may start the mechanism by throwing in the rapid traverse, and just before the rapid traverse is stopped, the work feed and spindle drive are started. The rapid traverse is then stopped and the work feed begins to move the tools into the work which is being revolved by the spindle. The work feed and spindle drive then come to a stop, and the rapid traverse comes into action and continues the movement at a rapid rate, since the timing is such that the tools are ready to be withdrawn from the work and the drum cams ready to return the carriages to starting position again. Finally the rapid traverse is stopped, and the machine is idle, ready for removal of the work and insertion of another piece of work.

One setting of the control element will take care of any number of pieces of work which are alike, and the timing device will have to be adjusted for each different kind of work to be done.

Referring first to the rapid traverse lever system, it will be noted that a shaft 26 passes through the shifter box, which shaft is connected to the hand lever 18ᵈ, and is connected to a central pivoted lever 18ᵉ which is linked to the clutch operating shaft 18. The lever 18ᵉ has mounted on its edge adjacent the control mechanism, a contact wheel 27. The shaft 26 within the shifter box has mounted thereon a cam 28, which cam is engaged by a roller 29 carried on an arm 30 (Fig. 14).

The arm 30 is mounted on a rock shaft 31, and mechanism operated by the timing wheels serves to rock the shaft 31 so as to bring the roller 29 against the cam 28. The cam 28 is loose on the shaft 26, but held against lengthwise movement with relation to it by means of collars 26ª. The cam 28 is driven by a gear 32 thereon, which is driven by the gearing 15ª from the main pulley, as has been noted.

The result of this structure is that when the rock shaft 31 is rocked, as will be described, and the roller 29 brought against the cam 28, the rotation of the cam will cause it to move across the shifter box carrying the shaft 26 with it. The shaft 26 being connected to the lever 18ᵉ, will actuate the clutch lever and throw in the rapid traverse.

In the present embodiment I have not shown a double cam on the shaft 26, nor a double arm and roller arrangement, and rely on a dog on one of the timing wheels to throw the rapid traverse off at the end of the operation or cycle.

The timing wheel 22 is formed with a way or T-slot 22ª therein, in which are mounted the cams which effect the several rapid traverse automatic movements. Slideways are formed in the face of the shifter box casting for a pair of rack bars 33 and 34 which have ends 33ª and 34ª, one turned to the right and the other to the left. The rack bars mesh with a gear 35 which is mounted on the rock shaft 31, so that when one rack bar is pushed up, the other one comes down and the rock shaft 31 is rocked.

To effect the operation of the rack bars, I provide for cams or dogs 36 and 37 on the cam wheel 22. These dogs are held adjustably in place in the T-slots by means of clamping bolts 38 which engage in the T-slots and pass out through the dogs. The dog 36 is pointed and set to engage the end 33ª of one of the rack bars. The dogs 37 have laterally branching portions 37ª to engage the contact wheel 27 on the rapid traverse clutch lever portion 18ᵉ, and portions 37ᵇ to engage the end 34ª of the other rack bar.

The rapid traverse cycle is then as follows: The operator first throws over the lever 18ᵈ to the left, which pulls over the lever 18ᵉ through the medium of the shaft 26, and thus starts the rapid traverse. The cam wheel 22 revolves around and the one dog 37 thereon is so placed as to contact with the roller 27 on the lever portion 18ᵉ and throw the rapid traverse off just at the point where the feed has brought the tools up to the work. The work feed then will be operating as will be described, and when the work has been accomplished the cam wheel 22 will have turned over slowly to the point where the dog 36 contacts with the rack bar end 33ª, thus pushing up the rack bar, rocking the shaft 31, and causing the shaft 26 to be moved to the left, which throws on the rapid traverse again. The rapid traverse then continues the motion of the cam drums, which returns the tools and carriage to starting position, and then the second dog 37 comes into play and at one time throws over the lever 18ᵉ to stop the traverse, and rocks the shaft 31 to insure the arm and roller being in a position ready for the operation above described during the next cycle of the machine.

Mounted on the end of the rock shaft 31 opposite the rack engaged end is a notched sector plate 31ª, which is engaged by the end of a spring arm 31ᵇ, to hold the rock shaft in whatever position it is set by the racks, until forced out of that position. The arm is spring held by the spring 31ᶜ and may have a terminal roller to engage the sector.

The automatic control of the work feed is accomplished through the upper mechanism in the shifter box. The lever 20 which it will be recalled actuates the clutch for the work feed and spindle drive, is pivotally connected to a shaft 39 corresponding to the shaft 26. This shaft has located thereon so as to be free to rotate but not to slide, a cylindrical cam 40, which has two cam surfaces terminating at a point in the middle of the cylindrical cam. The rock shaft 41 corresponding to the rock shaft 31 for the rapid traverse, is mounted in the walls of the shifter box, so as to be free to shift lengthwise to a slight degree.

Arranged on the rock shaft 41 is a gear 42 which is engaged by the two rack bars 43 and 44, which correspond to the rack bars 33 and 34, and have offset ends 43ª and 44ª, as in the instance of the said rack bars 33 and 34. The time wheel 21 has mounted thereon a pair of pointed dogs, like the dog 36, as indicated at 45. The dogs are adjustable as in the first instance described, and as the time wheel rotates will knock up first one of the rack bars and then the other.

On the rock shaft 41 is a double armed shifter structure having arms 46 and 47, each with a roller at the end, so arranged that when the shaft is rocked in opposite directions to the limit of the rack bar movement, the one or the other roller will contact with the cylindrical cam. The cylindrical cam is driven as in the instance of the first described cylindrical cam, by means of a gear 48 thereon which is constantly rotated.

When the time wheel 21 rocks the rock shaft 41 to bring the outer one of the roller arms into position of cam engagement, the rotation of the cam forces the shaft 39 to the left, which throws on the clutch for the work feed and spindle feed. When the time wheel forces up the other rack bar and rocks the shaft 41 back again, the other roller arm contacts with the cam at the opposite side of the central point, which results in feeding the shaft 39 back again.

The mechanism for holding the shifter structure in neutral is formed as follows: On the end of the rock shaft 41 is a sector plate 41ª which has deep notches 41ᵇ at each end thereof, and has shallower notches 41ᶜ and 41ᵈ at each side of the apex. The last two notches are only one-half the thickness of the sector, and one is on one side and one on the other of the central plane of the sector.

It will be recalled that the shaft 41 is free to move lengthwise slightly. The spring arm 49, which is like the spring arm 31ᵇ, engages the sector 41ᵃ in the terminal notches at the end of each shifting by means of the rack bar structure, and engages the sector in the two intermediate notches alternately, as will be noted.

To follow out the cycle of operation, it will be recalled that the rapid traverse is stopped when the tools are about ready to enter the work, and the left hand movement of the shaft 39 is initiated just before the rapid traverse stops. When the roller arm 47 engages the cam on the shaft 39, the first result of the cam movement is to pull the rock shaft 41 to the right slightly, by a lengthwise movement, whereupon the rock shaft cannot move any further, and the cam in its rotation forces the shaft 39 to the left so that the roller on the arm travels off at the end 40ᵃ of the cam. The arm 49 in the meantime rides over the peak of the sector plate 41ᵃ, and due to the plate being in a position to the right, will drop into the half notch 41ᶜ. At this point the roller will have moved to a position free of the cam, as noted above, and the sector plate will be held by the roller, with the work feed and spindle clutch in operation.

When the other dog on the cam wheel 21 strikes up the rack bar 43, this rocks the shaft 41 in the opposite direction to the movement of the first rack bar, and throws the other one of the roller arms (arm 46) into cam engagement, whereupon the opposite feeding takes place, with the rock shaft shifting first to the left and then the shaft 39 to the right, with the spring arm coming into engagement with the other half notch 41ᵈ, and holding the work feed clutch device off, and the shifter structure in neutral again.

The arrangement of the several dogs on the cam wheels will give a wide variety of possible movements, as the dogs can be increased in number to accomplish various movements. Normally, however, the total working stroke will be slow, preceded and succeeded by a rapid traverse, with the mechanism coming to a stop, and requiring a starting up by use of the rapid traverse lever, for each operation.

It will be noted that the shifter structure for the traverse feed could be a duplicate of the work feed shifter, in which case the rapid traverse could be shifted off and on by the shifter instead of being directly actuated by a laterally projecting dog on the cam wheel, independent of the shifter, in the structure as shown.

In adapting my mechanism to other forms of lathe feeds or other types of feed, it is evident that the same cycle of feed with rapid movement up to working point, followed by working, and again followed by rapid movement back to a stop, can be readily employed, or there might be a series of rapid movements interspersed with work feed movements, operating continuously without a stop.

Having thus described my invention, what I claim as new and desire to secure by Letters Patent, is:—

1. In a machine tool, a control mechanism comprising a shaft for controlling rapid drive, a shaft for controlling work drive, clutches operable by reciprocation of said shafts for rapid and work drives respectively, and means operated by the machine tool for alternately reciprocating said safts, said means comprising cylindical cams about said shafts, rotatable but not slidable thereon, members having substantially fixed position against movement with said shafts, and arranged, when actuated, to engage said cams, means for rotating the rams, and a timing mechanism adapted to actuate said members.

2. In a machine tool, a control mechanism comprising a shaft for controlling rapid drive, a shaft for controlling work drive, clutches operable by reciprocation of said shafts for rapid and work drives respectively, and means operated by the machine tool for alternately reciprocating said shafts, said means comprising cylindrical cams about said shafts, rotatable but not slidable thereon, rock shafts having members thereon to engage the said cams, whereby the cams will be forced in a direction to reciprocate the shafts, means for driving the cams, and a timing device adapted to impart rocking movement to said rock shafts.

3. In a control device for machine tools, a rotary cam, a rock shaft having an arm thereon, a gear on the rock shaft, a pair of rack bars both engaging said gear on opposite sides, and slidably mounted, a timing wheel having adjustable means thereon to engage said rack bars, means on the arm to engage the cam, and slidable means on which the cam is mounted and which is to be actuated to effect the desired control.

4. In a control device for machine tools, a member to be moved, a rock shaft, a cam on the member to be moved, cam engaging means on the rock shaft, means to rotate the cam so that same is forced to move by engagement with the cam engaging means, means to rock the rock shaft, so as to bring the cam engaging means into action, said cam arranged so that the engaging means in leaving the cam surface at the conclusion of an operation rocks the shaft away and out of cam engaging position.

5. In a control device for machine tools, a member to be moved, a rock shaft, a cam on the member to be moved, cam engaging means on the rock shaft, means to rotate the cam so that same is forced to move by engagement with the cam engaging means, means to rock the rock shaft, so as to bring the cam engaging means into action, said cam arranged so that the engaging means in leaving the cam surface at the conclusion of an operation rocks the shaft away and out of cam engaging position, and a locating device for the rock shaft comprising a notched plate, and resilient means to engage the notches therein.

6. In a control device for machine tools, a member to be moved, a rock shaft, a double cam on the member to be moved, double cam engaging means on the rock shaft, means to rock the said shaft so that one of the cam engaging means engages one of the cams selectively depending upon the direction in which the shaft is rocked, means to rotate said cams so as to force the member to be moved into a desired path of motion when the engaging means are effective, said cams arranged to force the cam engaging means out of engagement at the end of an operation, thus rocking the shaft.

7. In a control device for machine tools, a member to be moved, a rock shaft, a double cam on the member to be moved, double cam engaging means on the rock shaft, means to rock the said shaft so that one of the cam engaging means engages one of the cams selectively depending upon the direction in which the shaft is rocked, means to rotate said cams so as to force the member to be moved into a desired path of motion when the engaging means are effective, said cams arranged to force the cam engaging means out of engagement at the end of an operation, thus rocking the shaft, and a locating device for said shaft arranged to hold said rock shaft resiliently against movement in four positions, i. e. when in the position of being rocked into engagement with either of the cams, and when rocked out of engagement by either of the cams.

8. In a control device for machine tools, a member to be moved, a rock shaft, a double cam on the member to be moved, double cam engaging means on the rock shaft, means to rock the said shaft so that one of the cam engaging means engages one of the cams selectively depending upon the direction in which the shaft is rocked, means to rotate said cams so as to force the member to be moved into a desired path of motion when the engaging means are effective, said cams arranged to force the cam engaging means out of engagement at the end of an operation, thus rocking the shaft, and a locating device for said shaft arranged to hold said rock shaft resiliently against movement in four positions, i. e. when in the position of being rocked into engagement with either of the cams, and when rocked out of engagement by either of the cams, said means comprising a notched sector and an engaging member therefor having terminal notches in which the engaging member rests to secure the shaft in cam engagement position, and having intermediate partial width notches, in which the engaging member secures the forced out positions, said rock shaft being slidable sufficiently to move the partial width notches alternately into position for engagement with said member.

9. In a machine tool, a control device comprising a driven element, a device which when brought into engagement with the driven element will force the element to move in opposite directions depending upon the position of said device, said driven element being adapted to force the device out of engagement with it, and locating means to hold the said device in position when forced out of engagement with the driven element in either direction.

10. In a machine tool, a control device comprising a driven element, a device which when brought into engagement with the driven element will force the element to move in opposite directions depending upon the position of said device, said driven element being adapted to force the device out of engagement with it, and locating means to hold the said device in position when forced out of engagement with the driven element in either direction, and to hold it in position when brought into engagement with the driven element in either direction.

11. In a machine tool, the combination with rapid traverse and work feed driving mechanisms and means for selecting which driving mechanism is applied to the tool, of an automatic control element comprising a pair of rotary shiftable members acting to selectively apply said driving mechanisms, power means independent of either driving mechanism for shifting said members, devices to set said power means into operation, and adjustable timing means for actuating the said last named devices.

12. In a machine tool, the combination with rapid traverse and work feed driving mechanisms and means for selecting which driving mechanism is applied to the tool, of an automatic control element comprising a pair of rotary shiftable members acting to selectively apply said driving mechanisms, power means independent of either driving mechanism for shifting said members, devices to set said power means into operation, and adjustable timing means for actuating the said last named devices, said timing means driven in synchronism with the part of the machine tool to which said power is supplied.

WILLIAM F. GROENE.